US012261392B2

(12) United States Patent
Xu et al.

(10) Patent No.: US 12,261,392 B2
(45) Date of Patent: Mar. 25, 2025

(54) WATERPROOF STRUCTURE OF SOCKET CONNECTOR

(71) Applicants: JESS-LINK PRODUCTS CO., LTD., New Taipei (TW); ULTRASPEED ELECTRONICS CO., LTD., Taoyuan (TW)

(72) Inventors: Ming-Jun Xu, Taoyuan (TW); Wen-Fu Liao, Taoyuan (TW); Yun-Chang Yang, New Taipei (TW); Ming-Wei Chen, New Taipei (TW)

(73) Assignees: JESS-LINK PRODUCTS CO., LTD., New Taipei (TW); ULTRASPEED ELECTRONICS CO., LTD., Taoyuan (TW)

( * ) Notice: Subject to any disclaimer, the term of this patent is extended or adjusted under 35 U.S.C. 154(b) by 349 days.

(21) Appl. No.: 17/848,096

(22) Filed: Jun. 23, 2022

(65) Prior Publication Data

US 2023/0318224 A1 Oct. 5, 2023

(30) Foreign Application Priority Data

Apr. 1, 2022 (TW) ................................. 111112878

(51) Int. Cl.
*H01R 13/52* (2006.01)
*H01R 13/66* (2006.01)

(52) U.S. Cl.
CPC ..... *H01R 13/5202* (2013.01); *H01R 13/5205* (2013.01); *H01R 13/665* (2013.01)

(58) Field of Classification Search
CPC ............ H01R 13/5202; H01R 13/5205; H01R 13/665; H01R 13/512; H01R 13/533; H01R 13/746

(Continued)

(56) References Cited

U.S. PATENT DOCUMENTS 6,902,446 B1 * 6/2005 Healey .................. H02K 23/66 318/599
9,620,889 B1 * 4/2017 Buck .................. H01R 13/5205
(Continued)

FOREIGN PATENT DOCUMENTS

CN 111697384 A 9/2020
CN 215184607 U 12/2021
(Continued)

OTHER PUBLICATIONS

Office Action dated Nov. 14, 2023 of the corresponding Taiwan patent application No. 111112878 and application No. 111203368.

*Primary Examiner* — Alexander Gilman
(74) *Attorney, Agent, or Firm* — Chun-Ming Shih; HDLS IPR SERVICES

(57) ABSTRACT

A waterproof structure of a socket connector includes a waterproof housing, a socket, a cable, and a waterproof plug. The waterproof housing includes a wiring opening. The inner surface of the waterproof housing incudes a ring step surface facing the wiring opening. The wiring opening is covered by an end cap. The socket is received in the waterproof housing. The cable is connected to the socket and passes the wiring opening. The waterproof plug wrapping the cable is arranged in the wiring opening to close the wiring opening. The waterproof plug has an inner and an outer end, the inner end faces the socket, and a longitudinal annular rib is arranged on the inner end. The end cover is fastened to the waterproof housing along the longitudinal direction of the waterproof plug to press the outer end to make the longitudinal ring rib press the ring step surface.

6 Claims, 11 Drawing Sheets

(58) Field of Classification Search
USPC .......................................................... 439/359
See application file for complete search history.

(56) References Cited

U.S. PATENT DOCUMENTS

| | | | | |
|---|---|---|---|---|
| 10,601,191 | B2 * | 3/2020 | Yamazaki .............. | H01R 24/54 |
| 11,515,673 | B2 * | 11/2022 | Kato .................. | H01R 13/6215 |
| 2016/0093974 | A1 * | 3/2016 | Lai ....................... | H01R 13/521<br>439/736 |
| 2018/0006407 | A1 * | 1/2018 | Sasaki .................... | H01R 24/40 |
| 2018/0072383 | A1 * | 3/2018 | Montague ............... | B63B 1/246 |
| 2018/0183169 | A1 * | 6/2018 | Yamanaka ......... | H01R 13/5202 |
| 2018/0183177 | A1 * | 6/2018 | Yamanaka ........... | H01R 13/521 |
| 2018/0281914 | A1 * | 10/2018 | Burton ................... | B63H 20/12 |
| 2019/0054990 | A1 * | 2/2019 | Gebhart ................. | H02K 5/132 |
| 2019/0389551 | A1 * | 12/2019 | Aoki ...................... | B63H 11/08 |
| 2023/0318224 | A1 * | 10/2023 | Xu ..................... | H01R 13/5205<br>439/587 |

FOREIGN PATENT DOCUMENTS

| | | | |
|---|---|---|---|
| TW | M629607 | U | 7/2022 |
| WO | 2017205935 | A1 | 12/2017 |

* cited by examiner

WATERPROOF STRUCTURE OF SOCKET CONNECTOR

BACKGROUND

Technical Field

The technical field relates to an electrical connector, and in particular, to a socket connector of an immersion cooling type.

Description of Related Art

An optical transceiver is one of the key components of an optical communication system. An optical transceiver is able to convert electric signal and optical signal for transmitting information. During the conversion of optoelectrical signal, heat is also released. As the transmission speed of an optical transceiver increases, the amount of heat generated also increases. Accordingly, the outer surface of the optical transceiver requires further cooling mechanism, such as heat sink. With the development of immersion type of cooling system utilizing a dielectric fluid, the immersion type of cooling system is known to be applied to the cooling of optical transceivers. However, since an optical transceiver needs to be installed at the interface between dry and wet areas to facilitate its removal and installation, there is a need to improve its waterproofness and heat conduction performance.

In view of the above, the inventor seeks to overcome the aforementioned drawbacks associated with the related art and aims to provide an effective solution through extensive researches along with utilization of academic principles and knowledge.

SUMMARY

The present disclosure provides a socket connector of an immersion cooling type.

The present disclosure provides a waterproof structure of a socket connector, including a waterproof housing, a socket, a cable, and a waterproof plug. The waterproof housing includes a wiring opening, and an inner surface of the waterproof housing includes a ring step surface facing the wiring opening, and an end cap covering the wiring opening. The socket is received inside the waterproof housing, The cable is connected to the socket and passes through the wiring opening to penetrate out of the waterproof housing. The waterproof plug wraps a section of the cable and is disposed in the wiring opening to close the wiring opening. The waterproof plug includes an inner end and an outer end opposite to the inner end. The inner end is arranged toward the socket and includes a longitudinal annular rib formed thereon. In addition, the end cap is fastened to the waterproof housing along a longitudinal direction of the waterproof plug to press the outer end to make the longitudinal annular rib press the ring step surface.

For waterproof structure of the present disclosure, the end cap includes a plurality of brackets connected to each other to circumferentially define a through hole, when the plurality of brackets is assembled, an inner edge of the through hole presses against an outer surface of the waterproof plug. The plurality of brackets is respectively fastened to the waterproof housing along the longitudinal direction of the waterproof plug.

For the waterproof structure of the present disclosure, the outer surface of the waterproof plug includes a transverse annular rib, and the transverse annular rib abuts against the inner surface of the waterproof housing. A waterproof gasket is arranged between the end cap and an outer edge of the wiring opening. An annular slot is formed on the inner end, and the ring step surface closes the annular slot.

For the waterproof structure of the present disclosure, the socket includes a circuit board, the cable is connected to the circuit board and the waterproof plug wraps a connection area between the cable and the circuit board.

DETAILED DESCRIPTION

Figure 1:
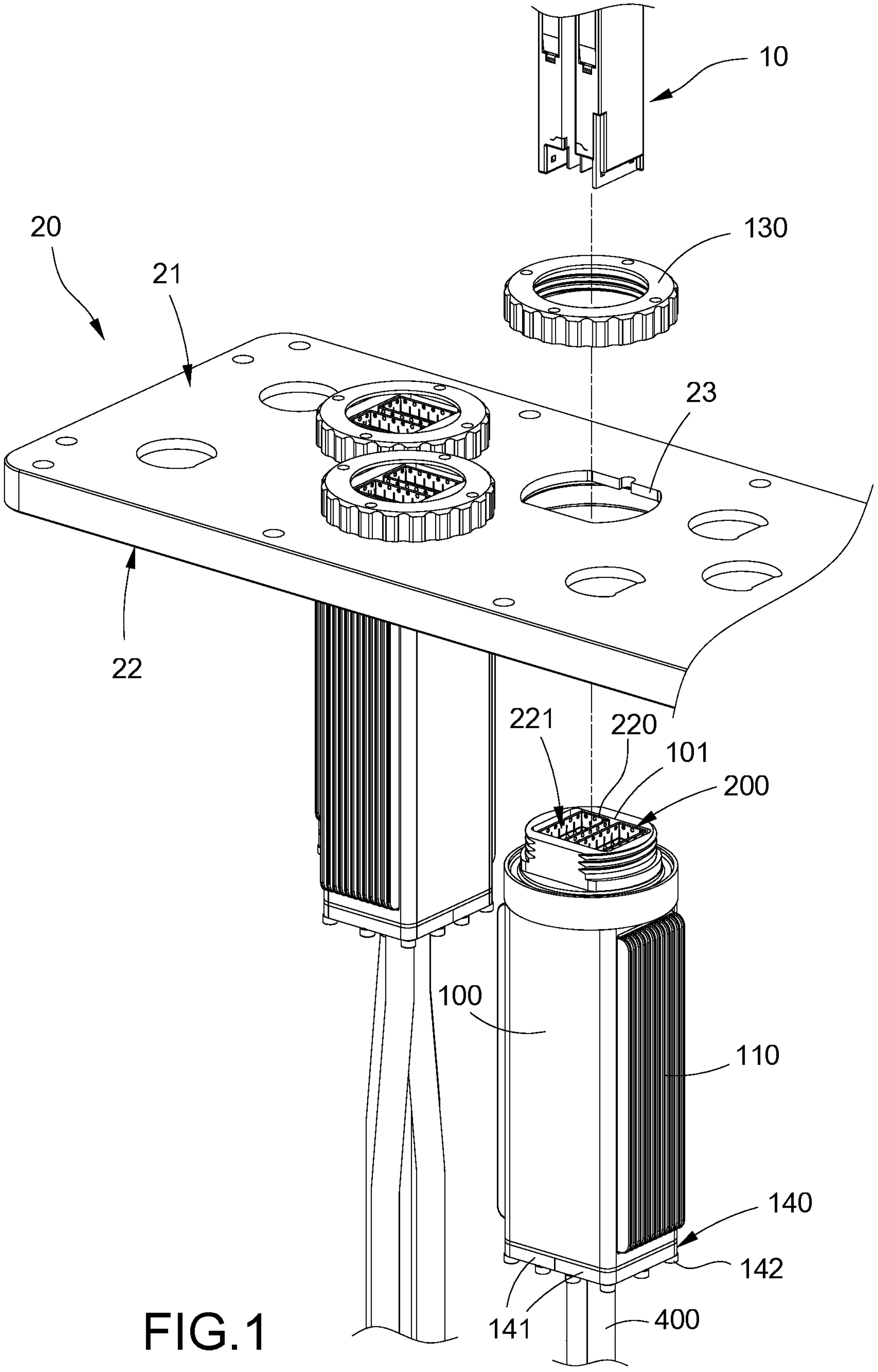
FIG. 1 is a perspective view of an exemplary embodiment of the socket connector of the present disclosure.
Figure 2:
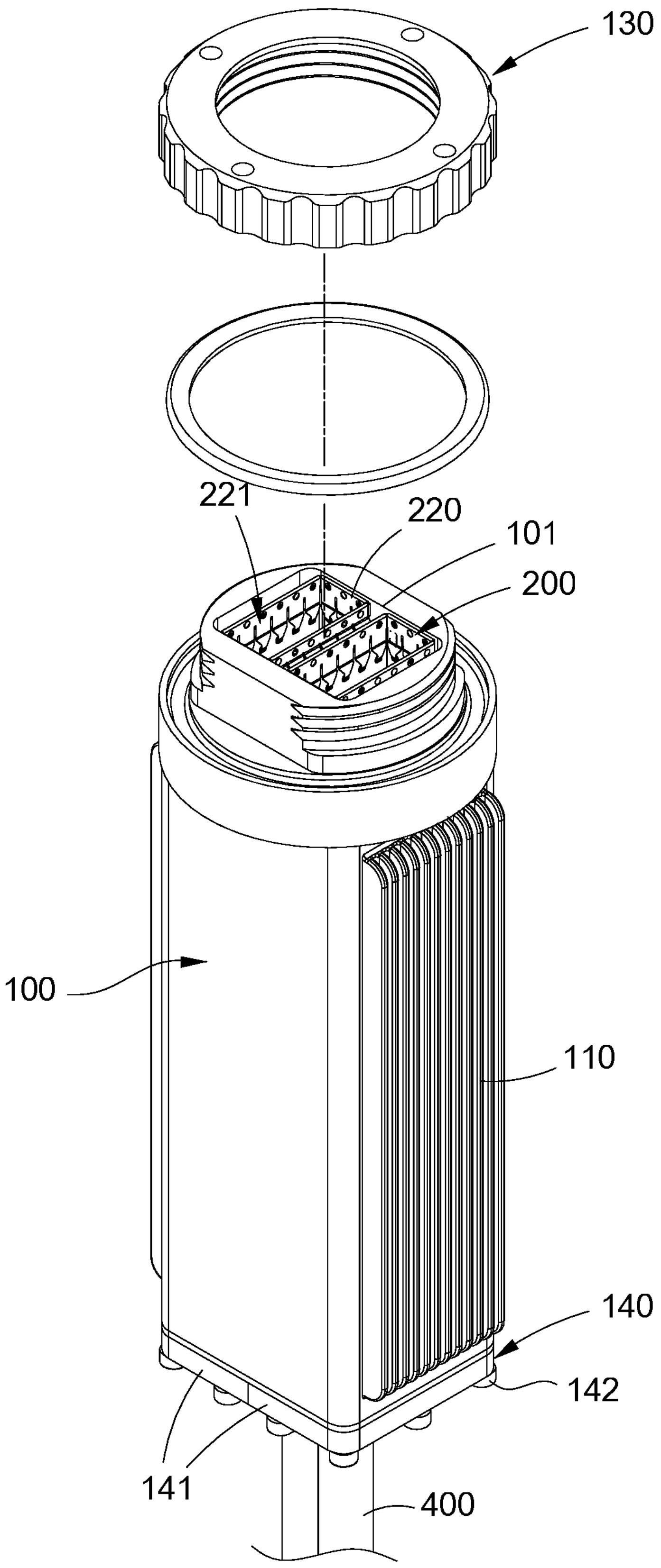
FIG. 2 is another perspective view of an exemplary embodiment of the socket connector of the present disclosure.

Please refer to FIG. 1 and FIG. 2. According to an exemplary embodiment of the present disclosure, a socket connector of an immersion cooling type is used for installation on a partition board 20 for a plug 10 to be inserted therein. To be more specific, the partition board 20 forms a part of a water tank, and one side of the partition board 20 is located on the dry side 21 at the external of the water tank, and another side of the partition board is located on the wet side 22 at the internal of the water tank. The partition board 20 includes an installation hole 23 formed thereon, and the installation hole 23 penetrates through the partition board 20.

Figure 3:
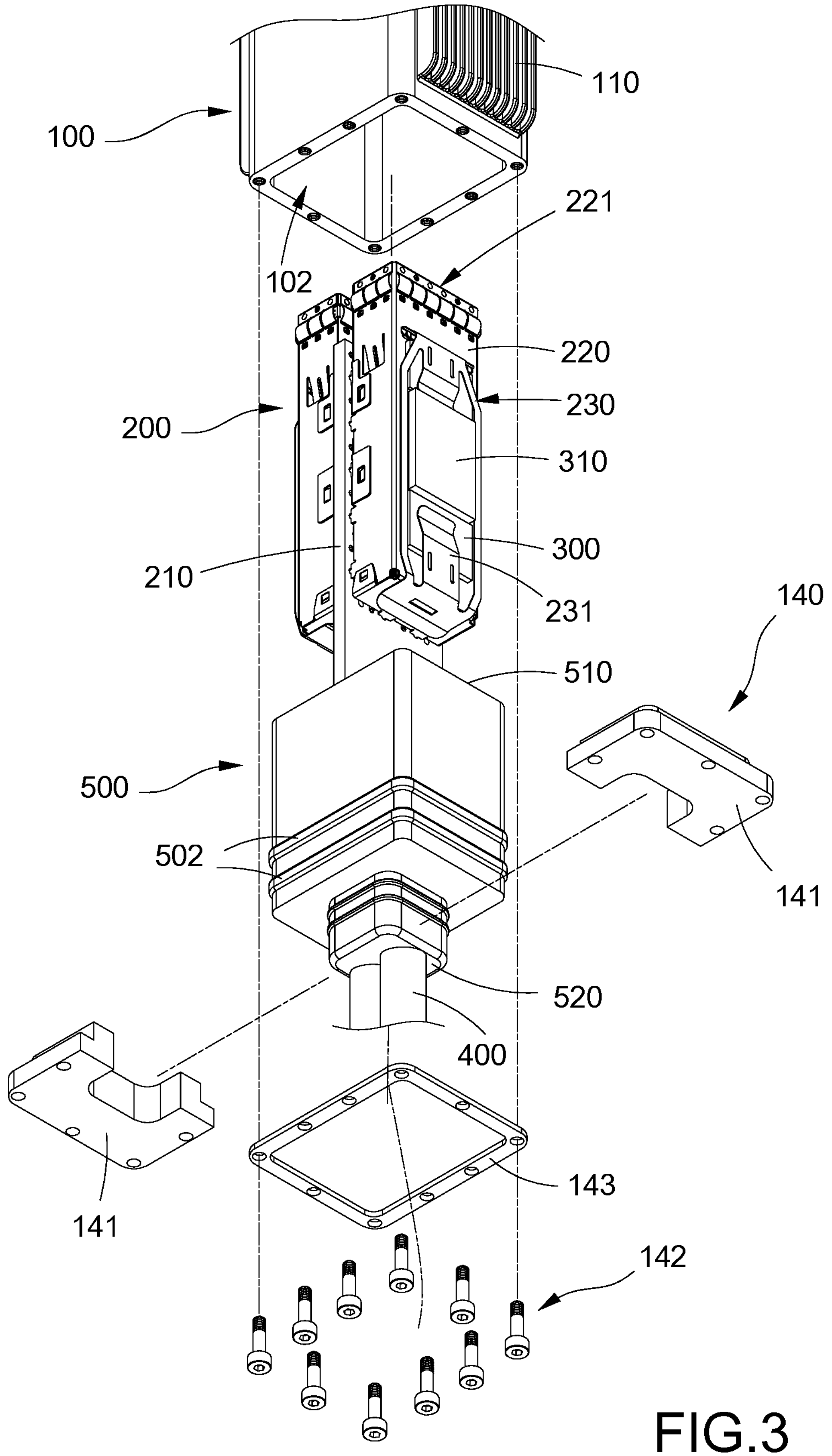
FIG. 3 is a perspective exploded view of an exemplary embodiment of the socket connector of the present disclosure.
Figure 4:
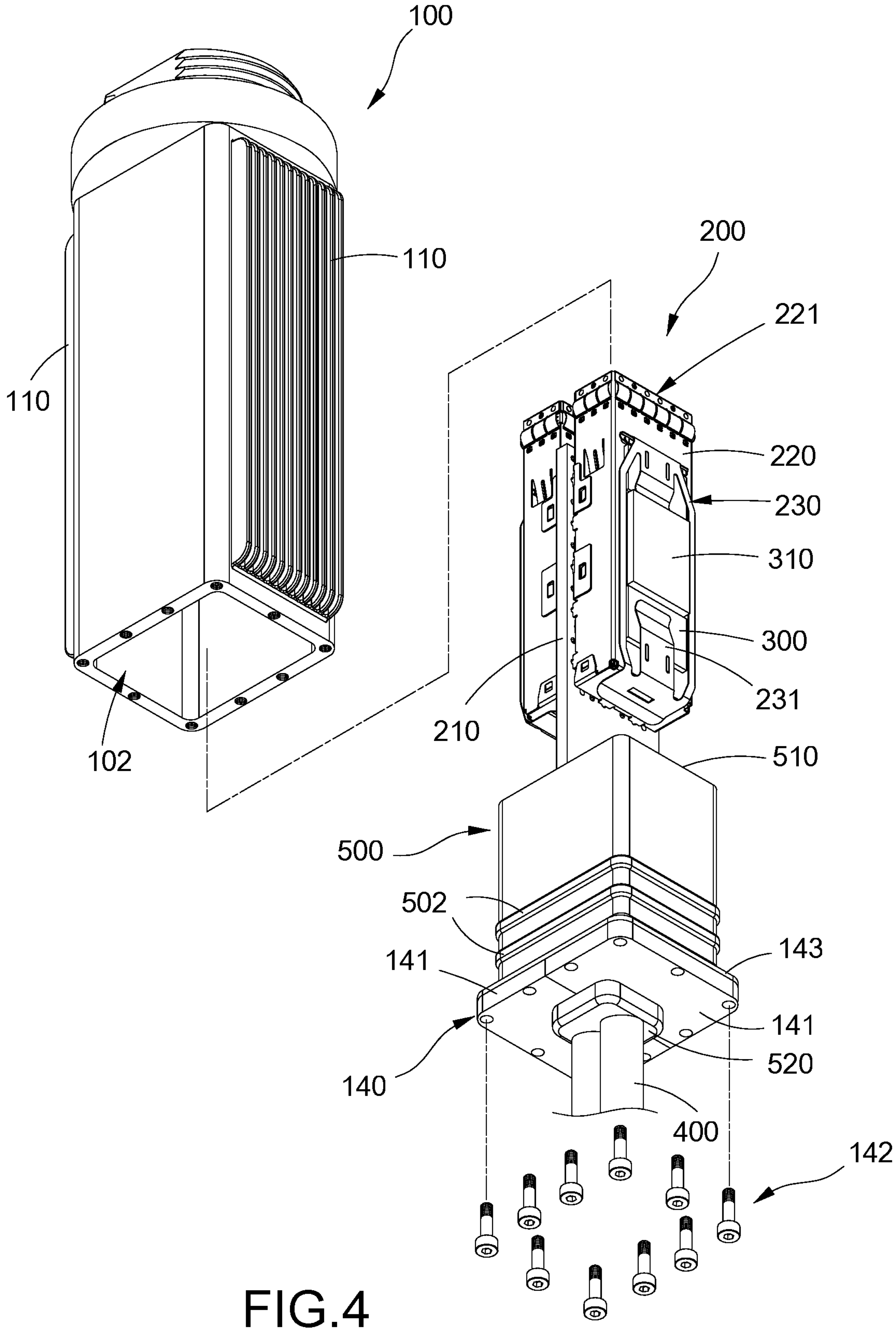
FIG. 4 is another perspective exploded view of an exemplary embodiment of the socket connector of the present disclosure.
Figure 5:
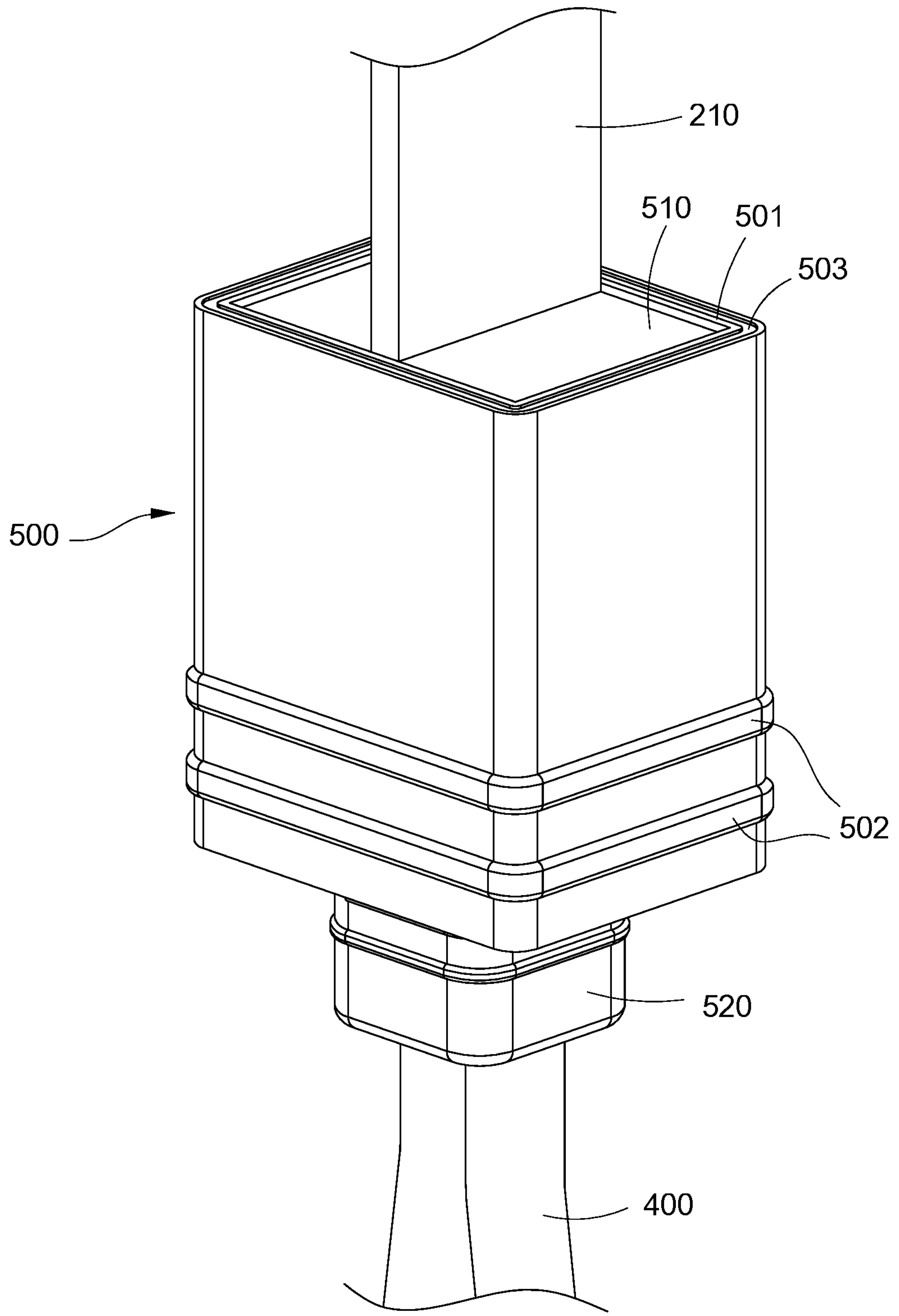
FIG. 5 is a perspective view of a waterproof plug in an exemplary embodiment of the socket connector of the present disclosure.
Figure 6:
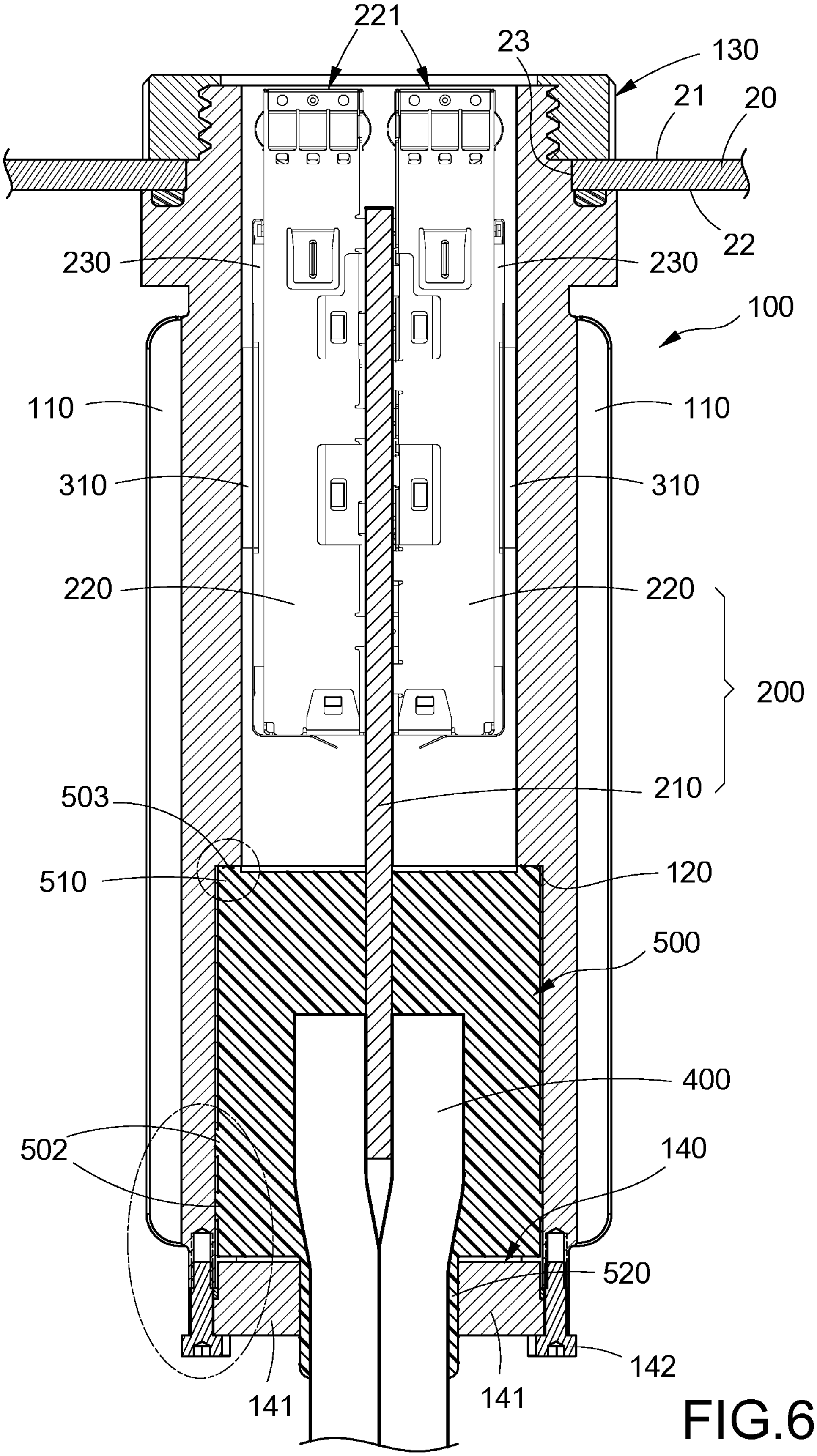
FIG. 6 is a longitudinally cross-sectional view of an exemplary embodiment of the socket connector of the present disclosure.
Figure 7:
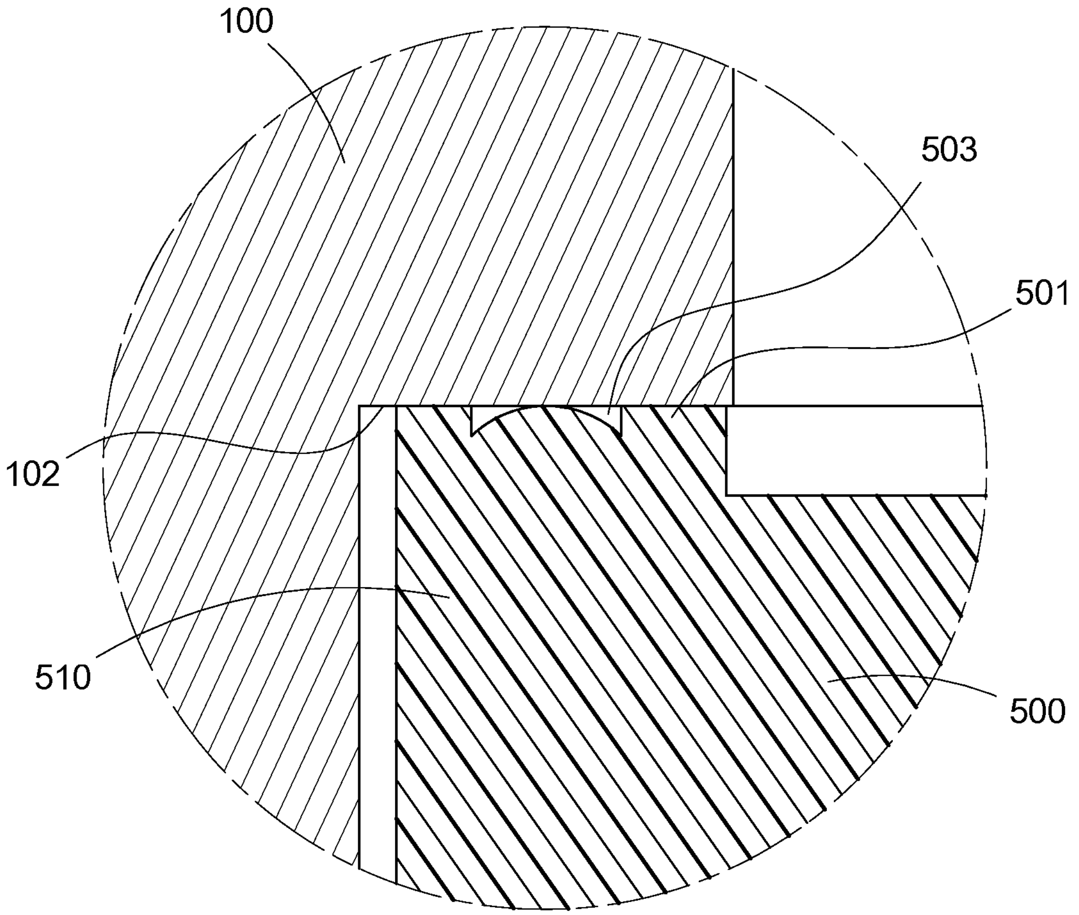
FIG. 7 is a partially enlarged view of FIG. 6.
Figure 8:
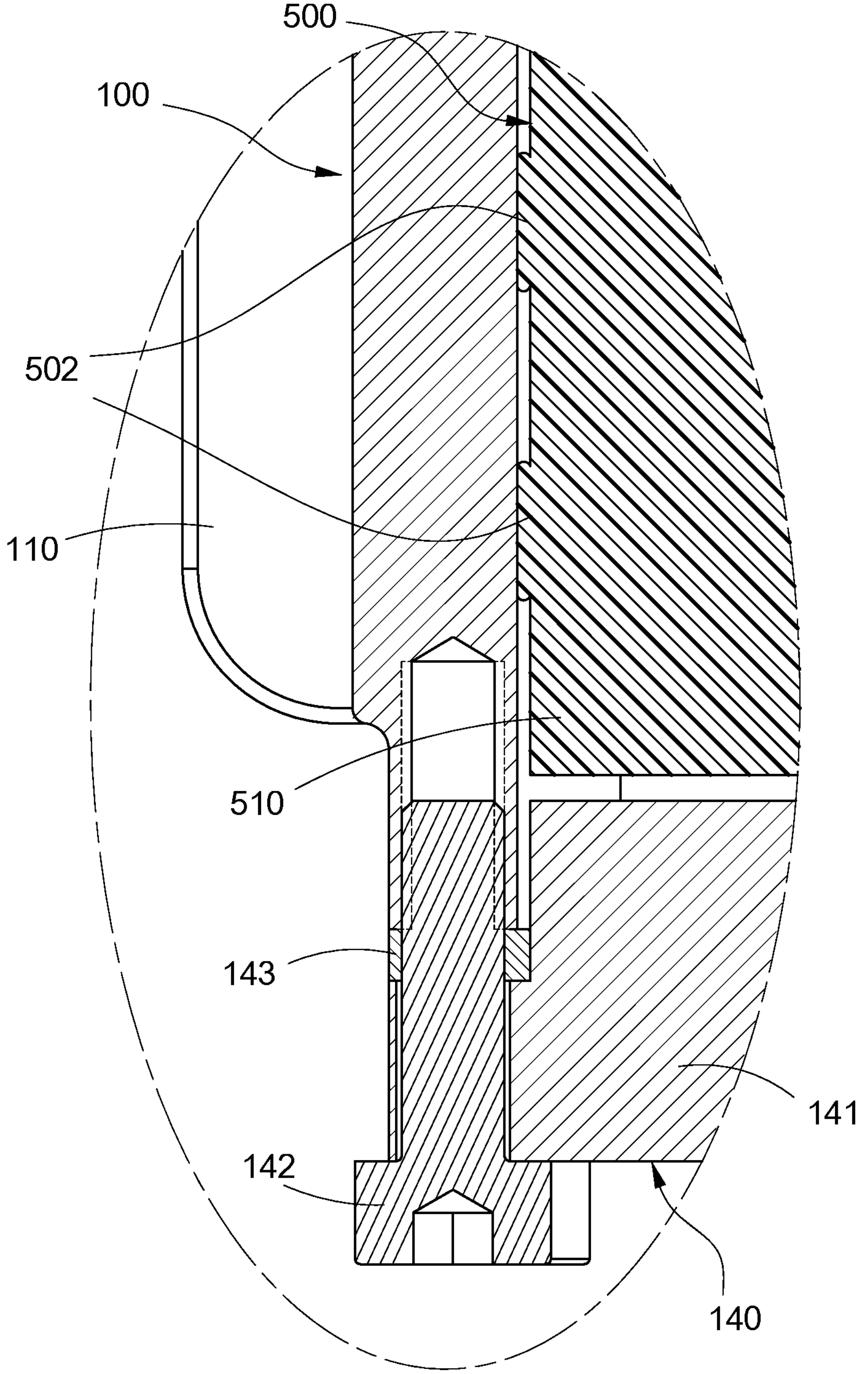
FIG. 8 is another partially enlarged view of FIG. 6.

Please refer to FIG. 2 to FIG. 4. In this exemplary embodiment, the socket connector of the present disclosure includes a waterproof housing 100, a socket 200, a heat conduction plate 300, a cable 400 and a waterproof plug 500.

Please refer to FIG. 1 to FIG. 4, in this exemplary embodiment, the waterproof housing 100 may have an elongated shape for penetrating through the installation hole 23 on the partition board 20. One end of the waterproof housing 100 includes an opening 101 of an open state, and the opening 101 is located at the dry side 21 of the partition board 20, and a press collar 130 is fastened to such end of the waterproof housing 100 to fasten and secure the waterproof housing 100 on the partition board 20. Another end of the waterproof housing 100 includes a wiring opening 102. The wiring housing 102 is located at the wet side 22 of the partition board 20. An end cover 140 is disposed on the wiring opening 102 to close the wiring housing 102, and a waterproof gasket 143 is disposed between the end cover 140 and the outer edge of the wiring opening 102. Accordingly, the internal of the waterproof housing 100 is connected to the dry side 21 of the partition board 20 and is isolated from the wet side 22 of the partition board 20. The inner side of the waterproof housing 100 includes a ring step surface 120 protruding therefrom, and the ring step surface 120 is arranged to face the wiring opening 100. The outer surface of the waterproof housing 100 includes a plurality of cooling fins 110. Accordingly, the cooling fins 110 are exposed at the wet side 22 of the partition board 20.

The socket 200 is received inside the waterproof housing 100. The socket 200 includes a circuit board 210 and at least one metal casing 220. In addition, the metal casing 220 is attached to the circuit board 210. In this exemplary embodiment, the socket 200 includes two identical metal casings 220, and the two meal casings 220 are symmetrically attached to two sides of the circuit board 210 respectively. In the content below, one of the metal casings 220 is used as an example to illustrate the structure of the metal casing 220. In this exemplary embodiment, the metal casing 220 has an elongated shape, and one end of the metal casing 220 includes an insertion opening 221, and a side surface of the metal casing 220 includes a side opening 222 formed thereon. The metal casing 220 penetrates into the internal of the waterproof housing 100 and also penetrates the opening 101 of the waterproof housing 100, such that the insertion opening 221 is able to align with the opening 101 to allow the plug 10 to be inserted into the socket 200 via the dry side 21 of the partition board 20.

Please refer to FIG. 3, FIG. 4 and FIG. 9 to FIG. 11. The heat conduction structure of the socket connector of the present disclosure is described in detail in the following:

The heat conduction plate 300 is movably attached to the outer side of the metal casing 220. One side of the heat conduction plate 300 passes through the side opening 222 to protrude out from the inner surface of the metal casing 220. In addition, another side of the heat conduction plate 300 includes a flexible heat conduction element 310 attached thereto. In this exemplary embodiment, the flexible heat conduction element 310 is a thermal paste or thermal pad made of a gel material of mixed metal powder. To be more specific, the heat conduction plate 300 includes a protruding stage 301 passing through the side opening 222 to protrude out of the inner surface of the metal casing 220. A slot 222 is formed at the opposite surface of the heat conduction plate 300 and the protruding stage 301, and the flexible heat conduction element 310 is received inside the slot 302. The flexible heat conduction element 310 is disposed between the inner surface of the waterproof housing 100 and the heat conduction plate 300 (the flexible heat conduction element 310 is spaced apart from the inner surface of the waterproof housing 100, that is, the flexible heat conduction element 310 does not contact the inner surface of the waterproof housing 100 before the socket 200 being inserted), such that during the assembly, it is able to allow the socket 200 to be inserted into the waterproof housing 100. The heat conduction plate 300 includes a guiding slope 303, and the guiding slope 303 is formed at one side of the protruding stage 301 and protrudes inside the metal casing 220. The guiding slope 303 is arranged to face the insertion opening 221.

Figure 9:
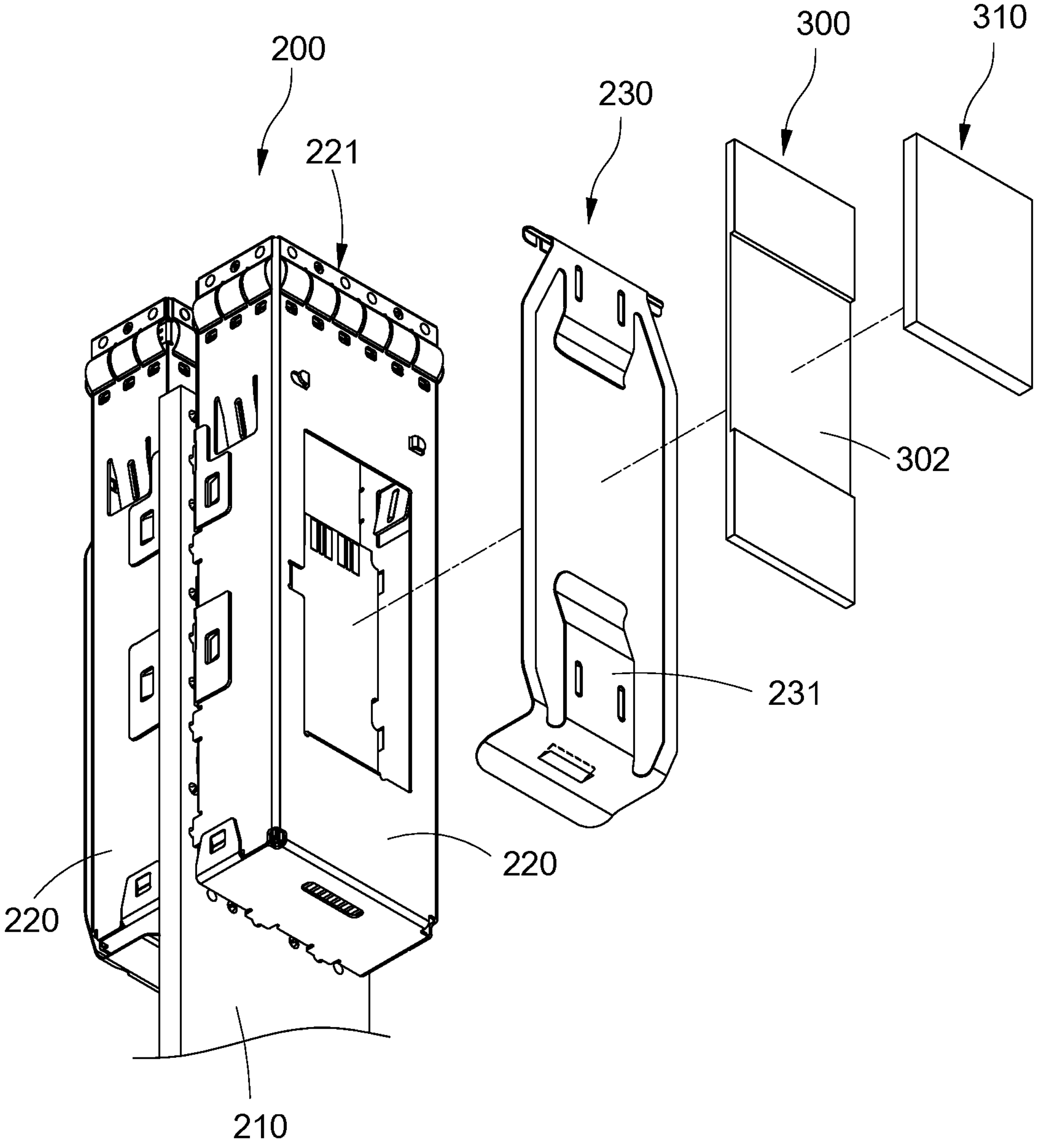
FIG. 9 is a schematic view of a heat conduction plate in an exemplary embodiment of the socket connector of the present disclosure.
Figure 10:
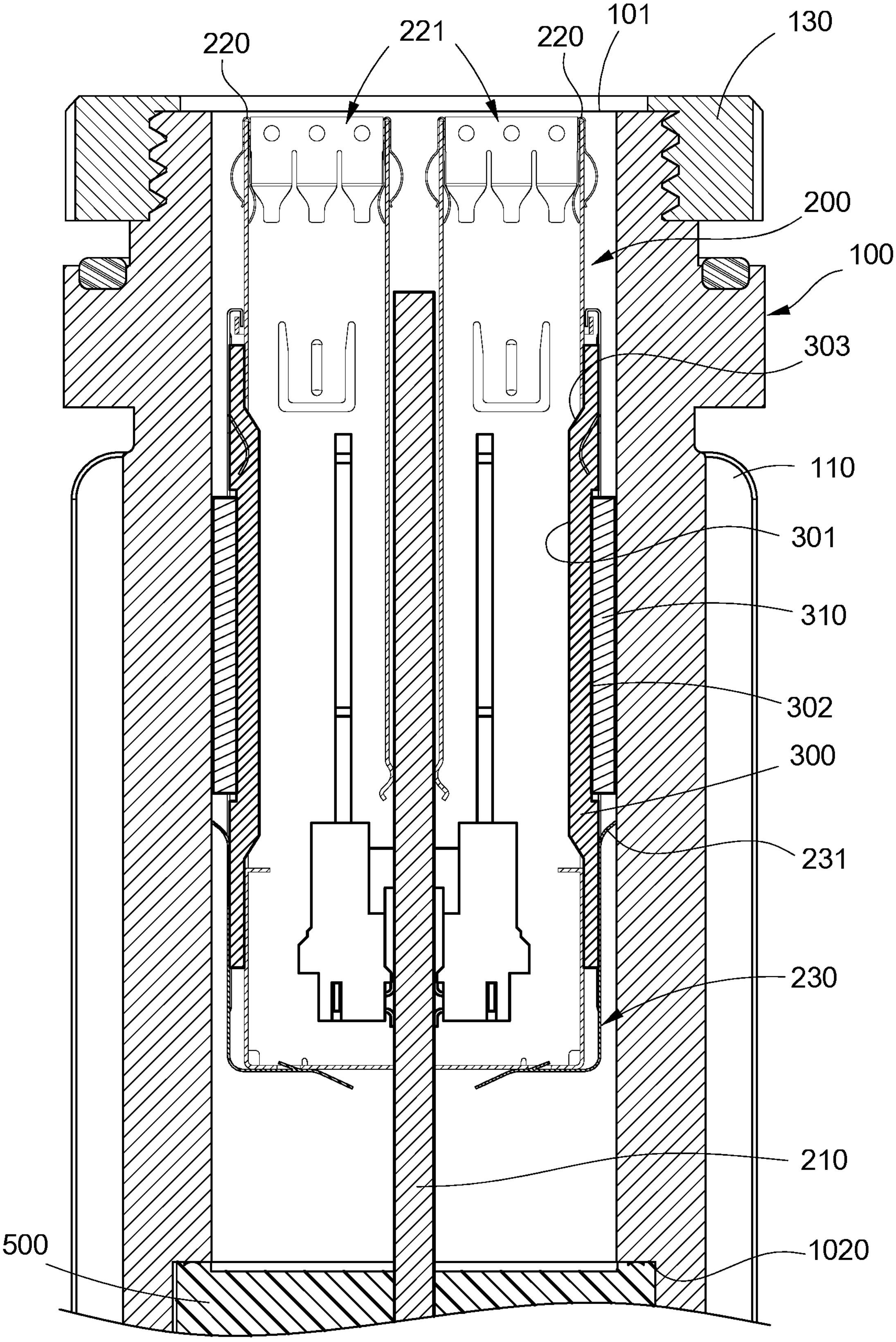
FIG. 10 is a schematic view of a heat conduction plate in use status according to an exemplary embodiment of the socket connector of the present disclosure.
Figure 11:
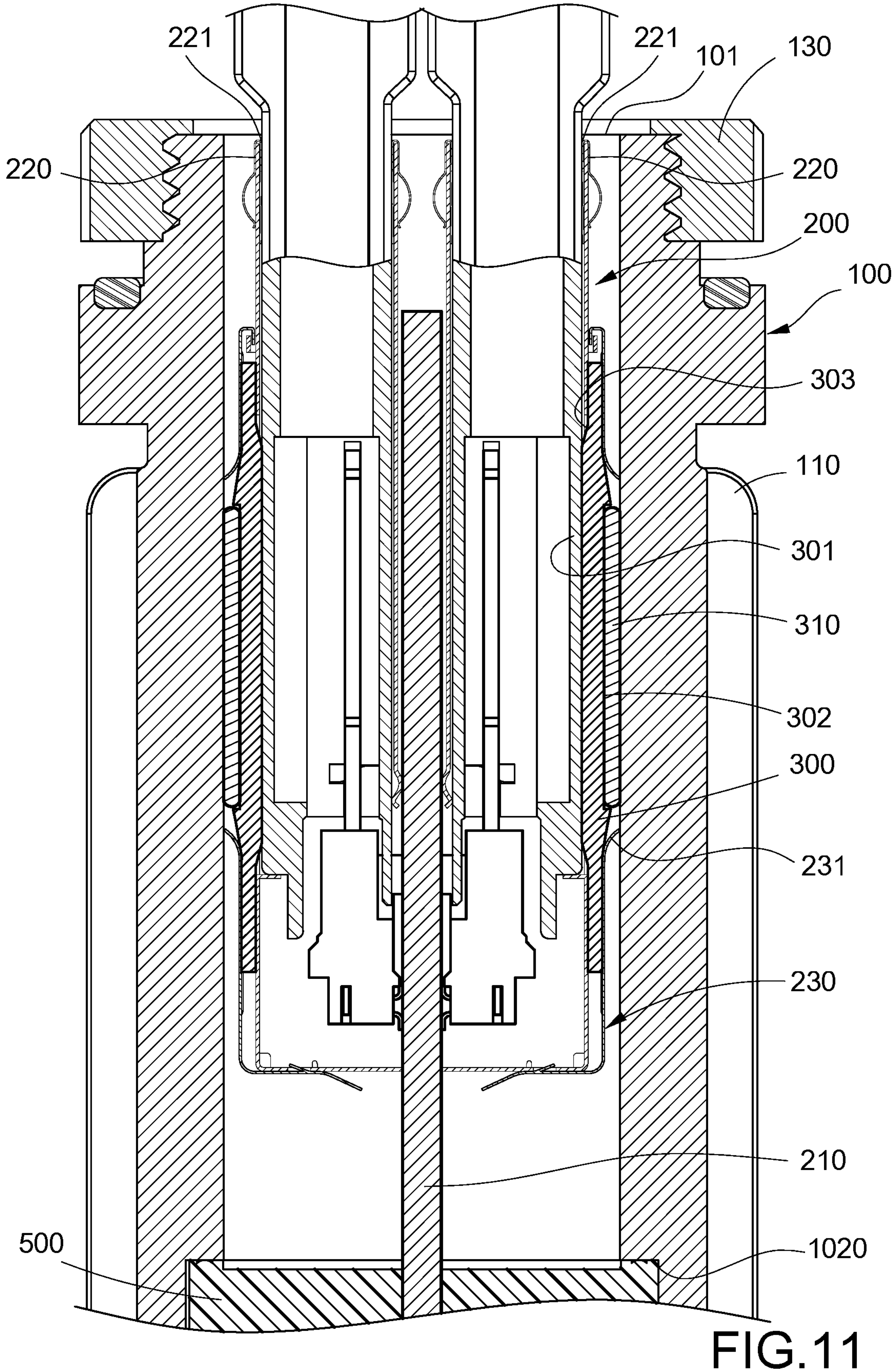
FIG. 11 is another schematic view of a heat conduction plate in use status according to an exemplary embodiment of the socket connector of the present disclosure.

Please refer to FIG. 9 to FIG. 11. When the plug 10 is inserted into the metal casing 220, the plug 10 pushes the heat conduction plate 300 via the protruding stage 301, and the plug 10 presses the protruding stage 301 to be thermally connected to the heat conduction plate 300, and the guiding slope 303 facilitates the plug 10 to push the protruding stage 301. The heat conduction plate 300 is pushed toward the external of the metal casing 220 to allow the flexible heat conduction element 310 to be compressed by the heat conduction plate 300 and the waterproof housing 100, thereby allowing the heat conduction plate 300 to be thermally connected to the waterproof housing 100. In some embodiments, the flexible heat conduction element 310 is arranged corresponding to the locations of the cooling fins 110, such that when the plug 10 is inserted into the metal casing 220, the heat conduction plate 300 is thermally connected to the cooling fins 110.

The metal casing 220 includes an elastic member 230, and the elastic member 230 is connected to the heat conduction plate 300. When the plug 10 is removed, the elastic member 230 may push the heat conduction plate 300 to return to its original position. To be more specific, the elastic member 230 is attached to the metal bracket 141 at the outer side of the metal casing 220, and the elastic member 230 includes an elastic arm 231 extended therefrom. In addition, the elastic arm 231 presses the heat conduction plate 300 to push the heat conduction plate 300 toward the internal of the metal casing 220.

Please refer to FIG. 3 to FIG. 8. The waterproof structure of the socket connector of the present disclosure is described in detail in the following:

One end of the cable 400 is connected to the circuit board 210 of the socket 200, and the cable 400 penetrates through the waterproof housing 100 via the wiring opening 102 to reach the internal of the water tank. The waterproof plug 500 wraps a section of the cable 400. To be more specific, the waterproof plug 500 wraps the connection area between the cable 400 and the circuit board 210, and the waterproof plug 500 is disposed at the wiring opening 102 to close the wiring opening 102. The waterproof plug 500 includes an inner end 510 and an outer end 520 opposite to the inner end 510. The inner end 510 of the waterproof plug 500 is arranged to face the socket 200 and the inner end 510 of the waterproof plug 500 includes a longitudinal annular rib 501 formed thereon. The end cap 140 is fastened to the waterproof housing 100 along the longitudinal direction of the waterproof plug 500 to press the outer end 520, thereby allowing the longitudinal annular rib 501 to press the ring step surface 120 to achieve the sealing effect. The inner end 510 of the waterproof plug 500 includes an annular slot 503, and the ring step surface 120 closes the annular slot 503. The internal of the annular slot 503 is filled with waterproof gel to achieve the sealing effect. The outer surface of the waterproof plug 500 includes a transverse annular rib 502, and the transverse annular rib abuts against the inner surface of the waterproof housing 100 to achieve the sealing effect.

To be more specific, the end cap 140 includes a plurality of brackets 141, and the brackets 141 are connected to each other to circumferentially define a through hole 103 for the waterproof plug 500 to penetrate therethrough. In addition, the plurality of brackets 141 are respectively fastened to the waterproof housing 100 along the longitudinal direction of the waterproof plug 500. Accordingly, when the plurality of brackets 141 are assembled, an inner edge of the through hole 103 presses against an outer surface of the waterproof plug 500 to achieve the sealing effect.

The above description is provided to illustrate the exemplary embodiments of the present disclosure only such that it shall not be treated as limitation to the claimed scope of the present disclosure. In addition, any equivalent modification made based on the present disclosure shall be considered to be within the claimed scope of the present disclosure.

What is claimed is:

1. A waterproof structure of a socket connector, the waterproof structure comprising:

a waterproof housing, comprising a wiring opening, a ring step surface disposed on an inner surface of the waterproof housing and facing the wiring opening, and an end cap covering the wiring opening;

a socket, received in the waterproof housing;

a cable, connected to the socket and passing through the wiring opening to penetrate out of the waterproof housing; and a waterproof plug, wrapping a section of the cable, disposed in the wiring opening to close the wiring opening, and comprising an inner end, an outer end opposite to the inner end, and a transverse annular rib disposed on an outer surface thereof, the inner end arranged toward the socket and a longitudinal annular rib disposed thereon;

wherein the end cap is fastened to the waterproof housing along a longitudinal direction of the waterproof plug to press the outer end to make the longitudinal annular rib to press the ring step surface and make the transverse annular rib to abut against the inner surface of the waterproof housing.

2. The waterproof structure according to claim 1, wherein the end cap comprises a plurality of brackets connected to each other to circumferentially define a through hole, and an inner edge of the through hole presses against an outer surface of the waterproof plug when the plurality of brackets is assembled.

3. The waterproof structure according to claim 2, wherein the plurality of brackets is respectively fastened to the waterproof housing along the longitudinal direction of the waterproof plug.

4. The waterproof structure according to claim 1, wherein a waterproof gasket is arranged between the end cap and an outer edge of the wiring opening.

5. The waterproof structure according to claim 1, wherein an annular slot is disposed on the inner end, and the ring step surface closes the annular slot.

6. The waterproof structure according to claim 1, wherein the socket comprises a circuit board, the cable is connected to the circuit board and the waterproof plug wraps a connection area between the cable and the circuit board.

* * * * *